(12) United States Patent
Lail et al.

(10) Patent No.: US 7,336,873 B2
(45) Date of Patent: Feb. 26, 2008

(54) OPTICAL TUBE ASSEMBLY HAVING A DRY INSERT AND METHODS OF MAKING THE SAME

(75) Inventors: Jason C. Lail, Conover, NC (US); Jody L. Greenwood, Hickory, NC (US); Douglas S. Hedrick, Connelly Springs, NC (US); James L. Baucom, Conover, NC (US); W. Welch McCollough, Jr., Newton, NC (US); Kenneth D. Temple, Jr., Newton, NC (US); Catharina L. Tedder, Catawba, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 10/661,204

(22) Filed: Sep. 12, 2003

(65) Prior Publication Data

US 2004/0120663 A1 Jun. 24, 2004

Related U.S. Application Data

(63) Continuation-in-part of application No. 10/326,022, filed on Dec. 19, 2002.

(51) Int. Cl.
*G02B 6/44* (2006.01)
(52) U.S. Cl. ...................... 385/100; 385/102
(58) Field of Classification Search ............. 385/100, 385/102, 108, 109
See application file for complete search history.

(56) References Cited

U.S. PATENT DOCUMENTS

| | | | | |
|---|---|---|---|---|
| 4,078,853 | A | 3/1978 | Kempf et al. ............. | 350/96.23 |
| 4,226,504 | A | 10/1980 | Bellino .................... | 350/96.23 |
| 4,420,220 | A | 12/1983 | Dean et al. ............... | 350/96.23 |
| 4,701,015 | A | 10/1987 | Saito et al. ............... | 350/96.23 |
| 4,705,571 | A * | 11/1987 | Lange et al. ............. | 106/287.1 |
| 4,707,569 | A | 11/1987 | Yoshimura et al. ........ | 174/116 |
| 4,725,628 | A | 2/1988 | Garvey et al. ............ | 521/137 |
| 4,725,629 | A | 2/1988 | Garvey et al. ............ | 521/137 |
| 4,815,813 | A * | 3/1989 | Arroyo et al. ............ | 385/102 |
| 4,818,060 | A | 4/1989 | Arroyo .................... | 350/96.23 |
| 4,909,592 | A | 3/1990 | Arroyo et al. ........... | 350/96.23 |
| 4,913,517 | A | 4/1990 | Arroyo et al. ........... | 350/96.23 |

(Continued)

FOREIGN PATENT DOCUMENTS

DE 2434280 7/1974

(Continued)

OTHER PUBLICATIONS

Norris, R. H.; Weimann, P.A., "Dry Central Tube Ribbon Cables for the Outside Plant Environment", Proc. Of the 51st Intern. Wire & Cable Symposium, p. 202-210 (2002).

(Continued)

*Primary Examiner*—Hae Moon Hyeon

(57) ABSTRACT

An optical tube assembly having at least one optical waveguide, at least one dry insert, and a tube. In one embodiment, the dry insert has a first layer and a second layer. The first layer is a polyurethane foam and the second layer is a water-swellable layer, wherein the dry insert is disposed within the tube and generally surrounds the at least one optical waveguide.

68 Claims, 9 Drawing Sheets

U.S. PATENT DOCUMENTS

| | | | |
|---|---|---|---|
| 4,979,795 A | 12/1990 | Mascarenhas | 350/96.23 |
| 5,016,952 A | 5/1991 | Arroyo et al. | 350/96.2 |
| 5,054,880 A | 10/1991 | Bruggendieck | 385/111 |
| 5,109,456 A | 4/1992 | Sano et al. | 385/100 |
| 5,125,063 A | 6/1992 | Panuska et al. | 385/113 |
| 5,133,034 A | 7/1992 | Arroyo et al. | 385/107 |
| 5,224,190 A | 6/1993 | Chu et al. | 385/107 |
| 5,243,675 A | 9/1993 | Kathiresan et al. | 385/109 |
| 5,377,290 A | 12/1994 | Ohta et al. | 385/100 |
| 5,422,973 A | 6/1995 | Ferguson et al. | 385/112 |
| 5,509,097 A | 4/1996 | Tondi-Resta et al. | 385/113 |
| 5,621,841 A | 4/1997 | Field | 385/113 |
| 5,621,842 A * | 4/1997 | Keller | 385/114 |
| 5,630,003 A | 5/1997 | Arroyo | 385/113 |
| 5,668,912 A | 9/1997 | Keller | 385/100 |
| 5,684,904 A | 11/1997 | Bringuier et al. | 385/109 |
| 5,689,601 A | 11/1997 | Hager et al. | 385/100 |
| 5,698,615 A | 12/1997 | Polle | 523/173 |
| 5,763,067 A | 6/1998 | Bruggemann et al. | 428/317.9 |
| 5,838,863 A * | 11/1998 | Fujiura et al. | 385/103 |
| 6,087,000 A | 7/2000 | Girgis et al. | 428/392 |
| 6,091,871 A | 7/2000 | Elisson et al. | 385/113 |
| 6,122,424 A * | 9/2000 | Bringuier | 385/100 |
| 6,178,278 B1 * | 1/2001 | Keller et al. | 385/109 |
| 6,226,431 B1 | 5/2001 | Brown et al. | 385/114 |
| 6,229,944 B1 | 5/2001 | Yokokawa et al. | 385/114 |
| 6,278,826 B1 * | 8/2001 | Sheu | 385/109 |
| 6,314,224 B1 | 11/2001 | Stevens et al. | 385/113 |
| 6,321,012 B1 | 11/2001 | Shen | 385/106 |
| 6,377,738 B1 * | 4/2002 | Anderson et al. | 385/113 |
| 6,389,204 B1 * | 5/2002 | Hurley | 385/102 |
| 6,463,199 B1 | 10/2002 | Quinn et al. | 385/109 |
| 6,504,979 B1 | 1/2003 | Norris et al. | 385/109 |
| 6,574,400 B1 | 6/2003 | Lail | 385/109 |
| 6,586,094 B1 | 7/2003 | Rebouillat et al. | 428/372 |
| 6,618,526 B2 | 9/2003 | Jackman et al. | 385/102 |
| 6,654,527 B2 | 11/2003 | Sakabe et al. | 385/114 |
| 6,711,329 B2 | 3/2004 | Zelesnik | 385/100 |
| 6,714,708 B2 | 3/2004 | McAlpine et al. | 385/110 |
| 6,728,451 B2 | 4/2004 | Kordahi | 385/100 |
| 6,749,446 B2 | 6/2004 | Nechitailo | 439/14 |
| 6,847,768 B2 | 1/2005 | Lail et al. | 385/111 |
| 2002/0009272 A1 * | 1/2002 | Parris | 385/109 |
| 2003/0044137 A1 | 3/2003 | Lopez | |
| 2003/0068147 A1 | 4/2003 | Nechitailo | |

FOREIGN PATENT DOCUMENTS

| | | |
|---|---|---|
| DE | 2445532 | 1/1976 |
| DE | 2434280 | 2/1976 |
| DE | 2743260 | 4/1979 |
| DE | 2944997 | 11/1979 |
| DE | 3444500 A1 | 11/1985 |
| DE | 19713063 A1 | 10/1998 |
| DE | 10129772 A1 | 1/2003 |
| EP | 0022036 | 1/1981 |
| EP | 0353775 | 4/1989 |
| EP | 0577233 A1 | 1/1994 |
| EP | 0916980 A1 | 5/1999 |
| EP | 1085357 | 4/2000 |
| EP | 1087247 | 4/2000 |
| EP | 1065545 A1 | 1/2001 |
| EP | 1170614 A1 | 1/2002 |
| EP | 1302796 A1 | 4/2003 |
| GB | 2159291 A | 11/1985 |
| GB | 2189071 A * | 10/1987 |
| JP | 60-087307 | 5/1985 |
| JP | 61-023104 | 1/1986 |
| JP | 9-152535 | 6/1997 |
| JP | 11-271581 | 10/1999 |
| JP | 11-337783 | 12/1999 |
| JP | 2001-343565 | 12/2001 |
| JP | 2001-343566 | 12/2001 |
| JP | 2002-236241 | 8/2002 |
| WO | 02/099491 A1 | 12/2002 |
| WO | WO2005010565 | 7/2004 |

OTHER PUBLICATIONS

Van Vickle, P., et al., "Innovative Dry Buffer Tube Design for Central Tube Ribbon Cable", Proc. Of the 2001 National Fiber Optics Engineers Conference, p. 154-161 (2001).

Taylor, C., et al., "Effect of Water Blocking Materials On Moisture Diffusion in Prototype Cable Structures", Proc. of the 50th Intern. Wire & Cable Symposium, p. 518-525 (2001).

Dixon, L., et al., "Crush and Bending Resistance in Next Generation Cable Designs", Proc. Of the 50th Intern. Wire & Cable Symposium, p. 422-431 (2001).

Wagman, R., et al., "BOTDR Analysis of Cable Tensile Testing", Proc. Of the 48th Intern. Wire & Cable Symposium, p. 658-664 (1999).

Beasley, B., "Look, Mom! No Gel!" Outside Plant Magazine. Dec. 2002. p. 16-18.

Geca-Tapes, Non-Woven Wrapping-Tapes Catalog "Foam Tapes", Apr. 1996.

Geca-Tapes, Waterblocking Tapes Catalog—"Waterblocking Foam Tapes", Apr. 1996.

Dow Plastics, "Resin For Pipe Extrusion and Pipe Fittings", Apr. 7, 2003.

Chung, Su-Vun, "Macrobend Loss of 1300nm Optimized Single Mode Fibre" at 1550nm, International Wire & Cable Symposium Proceedings 1988, pp 704-709.

Okada et al., Proceedings of the 49th International Wire and Cable Symposium "Development of New Dry Tube with Water Blocking Laminated Tape", Nov. 2000.

* cited by examiner

OPTICAL TUBE ASSEMBLY HAVING A DRY INSERT AND METHODS OF MAKING THE SAME

RELATED APPLICATIONS

The present application is a Continuation-In-Part (CIP) of U.S. Ser. No. 10/326,022 filed on Dec. 19, 2002, the disclosure of which is incorporated herein by reference.

FIELD OF THE INVENTION

The present invention relates generally to dry packaging of optical waveguides. More specifically, the invention relates to an optical tube assembly that includes at least one dry insert for protecting at least one optical waveguide.

BACKGROUND OF THE INVENTION

Fiber optic cables include optical waveguides such as optical fibers that transmit optical signals, for example, voice, video, and/or data information. One type of fiber optic cable configuration includes an optical waveguide disposed within a tube, thereby forming a tube assembly. Generally speaking, the tube protects the optical waveguide; however, the optical waveguide must be further protected within the tube. For instance, the optical waveguide should have some relative movement between the optical waveguide and the tube to accommodate bending. On the other hand, the optical waveguide should be adequately coupled with the tube, thereby inhibiting the optical waveguide from being displaced within the tube when, for example, pulling forces are applied to install the cable. Additionally, the tube assembly should inhibit the migration of water therein. Moreover, the tube assembly should be able to operate over a range of temperatures without undue optical performance degradation.

Conventional optical tube assemblies meet these requirements by filling the tube with a thixotropic material such as grease. Thixotropic materials generally allow for adequate movement between the optical waveguide and the tube, cushioning, and coupling of the optical waveguide. Additionally, thixotropic materials are effective for blocking the migration of water within the tube. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the tube at relatively high temperatures and the thixotropic materials may cause optical attenuation at relatively low temperatures.

Cable designs have attempted to eliminate thixotropic materials from the tube, but the designs are generally inadequate because they do not meet all of the requirements and/or are expensive to manufacture. One example that eliminates the thixotropic material from the tube is U.S. Pat. No. 4,909,592, which discloses a tube having water-swellable tapes and/or yarns disposed therein. This design requires a large number of water-swellable components within the tube to adequately couple optical fibers to the tube. The use of large numbers of water-swellable components is not economical because it increases the cost of the cable. Another example that eliminates the thixotropic material is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable.

SUMMARY OF THE INVENTION

The present invention is directed to an optical tube assembly including a tube, at least one optical waveguide, and at least one dry insert. The at least one optical waveguide and the at least one dry insert are disposed within the tube. The at least one dry insert has a first layer and a second layer. The first layer is a polyurethane foam and the second layer is a water-swellable layer, wherein the dry insert generally surrounds the at least one optical waveguide.

The present invention is further directed to an optical tube assembly that includes a tube having an interior surface, at least one optical waveguide disposed within the tube, and at least one dry insert. The at least one optical waveguide having a positive excess length compared with the tube. The at least one dry insert has at least two laminated layers generally surrounding the at least one optical waveguide, thereby forming a core that is disposed within the tube. The at least one dry insert couples the at least one optical waveguide to the interior surface of the tube while cushioning the at least one optical waveguide, thereby maintaining an optical attenuation below about 0.4 dB/km.

Additionally, the present invention is directed to an optical tube assembly including a tube, at least one optical waveguide, and at least one dry insert. The at least one dry insert having a polyurethane foam layer, wherein the at least one dry insert and the at least one optical waveguide form a core disposed within the tube. The at least one optical waveguide has a normalized pull-out force between about 0.5 N/m and about 5.0 N/m. Furthermore, tube assemblies of the present invention can be used in a various cable configurations.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
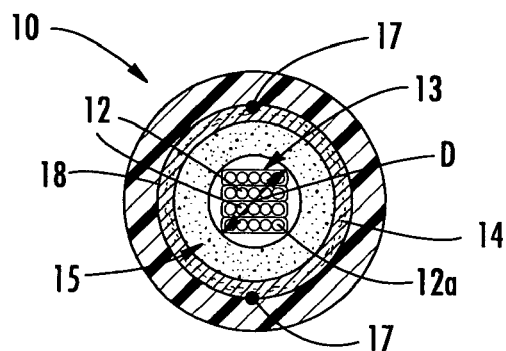
FIG. 1 is a cross-sectional view of a tube assembly according to the present invention.
Figure 1A:
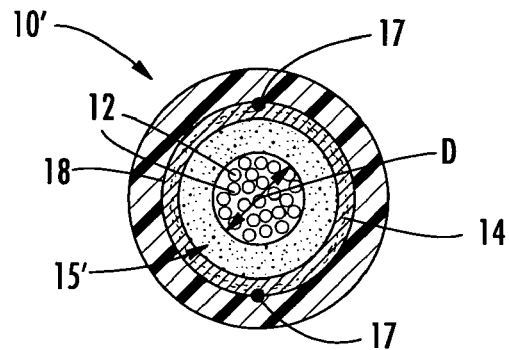
FIG. 1a is a cross-sectional view of another tube assembly according to the present invention.
Figure 5:
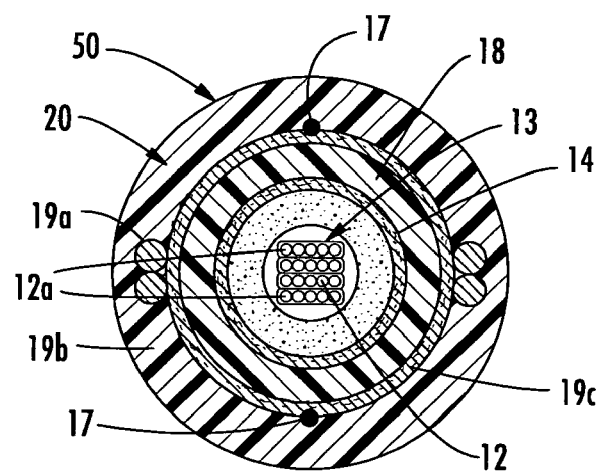
FIG. 5 is a cross-sectional view of a fiber optic cable according to one embodiment of the present invention.

Illustrated in FIG. 1 is an exemplary tube assembly 10 according to one aspect of the present invention. Tube assembly 10 includes at least one optical waveguide 12, at least one dry insert 14, and a tube 18. In this case, the at least one optical waveguide 12 is in the form of a stack of ribbons 13 having a diagonal D dimension across the corners of the stack. Dry insert 14 generally surrounds the at least one optical waveguide 12 and forms core 15, which is disposed within tube 18. Dry insert 14 performs functions such as cushioning, coupling, inhibiting the migration of water, and accommodates bending. Dry insert 14 is advantageous because the optical waveguides are easily removed therefrom without leaving a residue or film that requires cleaning before connectorization. Moreover, unlike conventional thixotropic materials, dry insert 14 does not change viscosity with temperature variations or have a propensity to drip from an end of the tube at high temperatures. Furthermore, tube assembly 10 can include other suitable components such as a polyester binder thread 17 to hold dry insert 14 about optical waveguide 12. Likewise, two or more threads may be stitched together for holding dry insert 14 together before extruding tube 18 therearound. FIG. 1a shows tube assembly 10', which is a variation of tube assembly 10. Specifically, tube assembly 10' includes a plurality of loose optical waveguides 12, instead of the stack of ribbons 13. In this case, tube assembly 10' includes twenty-four loose optical waveguides 12 having diagonal dimension D, but any suitable number of optical waveguides may be used. Moreover, optical waveguides 12 may be bundled into one or more groups using binders, water-swellable threads, tapes, wraps, or other suitable materials. Additionally, tube assemblies 10 or 10' can be a portion of cable as shown in FIG. 5.

As depicted, optical waveguide 12 is an optical fiber that forms a portion of an optical fiber ribbon. In this case, the optical waveguides are a plurality of single-mode optical fibers in a ribbon format that form ribbon stack 13. Ribbon stack 13 can include helical or S-Z stranding. Additionally, other types or configurations of optical waveguides can be used. For example, optical waveguide 12 can be multi-mode, pure-mode, erbium doped, polarization-maintaining fiber, other suitable types of light waveguides, and/or combinations thereof. Moreover, optical waveguide 12 can be loose or in bundles. Each optical waveguide 12 may include a silica-based core that is operative to transmit light and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. In one embodiment, one or more optical waveguides 12 include a coating system as disclosed in U.S. patent application Ser. No. 10/632,219 filed on Jul. 18, 2003, the disclosure of which is incorporated herein by reference. Optical waveguide 12 can also include an identifying means such as ink or other suitable indicia for identification. Suitable optical fibers are commercially available from Corning Incorporated of Corning, N.Y.

In other embodiments, ribbon stack 13 can have a corner optical waveguide(s) 12a with a predetermined mode-field and cutoff (MAC) number, thereby inhibiting optical attenuation of the corner optical waveguide when subjected to compressive forces. Stated another way, selecting corner optical waveguides with a predetermined MAC number places optical waveguides that are less sensitive to optical attenuation from compressive forces in ribbon stack locations that experience relatively high levels of compression. As used herein, MAC number is calculated as a mode field diameter (MFD) divided by a cutoff wavelength for the given optical waveguide 12a where both quantities are expressed in micrometers so that the MAC number is dimensionless. In other words, MFD is typically expressed in micrometers and cutoff wavelength is typically expressed in nanometers, so the cutoff wavelength must be divided by 1000 to convert it to micrometers, thereby yielding a dimensionless MAC number.

In preferred embodiments, one or more of the corner optical waveguides 12a have a predetermined MAC number. Specifically, the MAC number is about 7.35 or less, more preferably about 7.00 or less, and most preferably about 6.85 or less. By way of example, corner optical waveguide(s) 12a is selected with a MFD of 9.11 μm or less and a cutoff wavelength of 1240 nm or more, thereby yielding 7.35 or less for the MAC number. Generally speaking, the MAC number is directly proportional to MFD and inversely proportional to the cutoff wavelength. Ribbon stack 13 has four corner optical waveguides 12a; however, other ribbon stack configurations can include more corner positions. For instance, a ribbon stack having a generally plus sign shape includes eight outer corners. Likewise, other ribbon stack configurations may have other numbers of corner positions.

Additionally, ribbon embodiments of the present invention may have a positive excess ribbon length (ERL), although a negative ERL is possible. As used herein, ERL is defined as the length of the particular ribbon minus the length of the tube or cable containing the ribbon divided by the length of the tube or cable containing the ribbon, which can be expressed as a percentage by multiplying by 100. Whether the ERL is calculated using the tube length or the cable length depends on the particular configuration. Moreover, individual ribbons of a cable can have different values of ERL. By way of example, ribbons of the cable have a positive ERL, preferably a positive ERL in the range of about 0.0% to about 0.2% or greater. Likewise, embodiments having loose or bundled optical fibers may include a positive excess fiber length (EFL).

Figure 2:
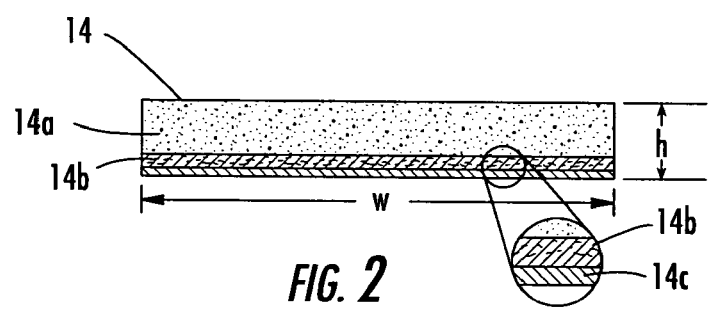
FIG. 2 is a cross-sectional view of the dry insert of the tube assembly of FIG. 1.

FIG. 2 illustrates a cross-sectional view of dry insert 14. Dry insert 14 is formed from an elongate material or materials that are capable of being paid off from a reel for a continuous application during manufacture. Dry insert 14 is preferably formed from a plurality of layers that can perform different functions; however, the dry insert can be a single layer such as a compressible layer. Dry insert 14 cushions optical waveguide 12 from tube 18, thereby maintaining optical attenuation of optical waveguide 12 below about 0.4 dB/km at a reference wavelength of 1310 nm and 0.3 dB/km at a reference wavelengths of 1550 nm and 1625 nm. In one embodiment, dry insert 14 is formed from two distinct layers. For instance, a first layer 14a of dry insert 14 is a compressible layer and second layer 14b is a water-swellable layer. First layer 14a is formed from a compressible material having a predetermined spring constant for providing adequate coupling characteristics. By way of example, the first layer is a foam tape, preferably, an open cell foam tape; however, any suitable compressible material can be used such as a closed cell foam tape.

In one embodiment, the first layer is an open cell polyurethane (PU) foam tape. The PU foam tape may either be an ether-based PU or an ester-based PU, but other suitable foam tape compressible layers can be used such as a polyethylene foam, a polypropylene foam, or EVA foam. However, preferred embodiments use an ether-based foam tape since it performs better than an ester-based PU foam when subject to moisture. In other words, the ester-based PU foam can break down with moisture, whereas the ether-based PU foam is generally more robust with respect to moisture. Additionally, the foam layer has a predetermined density generally in the range of about 1 lb/ft$^3$ to about 3 lb/ft$^3$, but in preferred embodiments the density is about 2 lb/ft$^3$. Dry insert 14 also has a predetermined ultimate tensile strength to inhibit breakage during manufacture. Generally speaking, with dry inserts having both a compressible layer and a water-swellable layer the majority of the tensile strength is provided by the water-swellable layer(s). The ultimate tensile strength of the dry insert is preferably about 20 Newtons per centimeter width W of dry insert 14 or greater, more preferably about 30 Newtons per centimeter width W of dry insert 14 or greater.

Dry insert 14 preferably has a water-swell speed so that the majority of swell height of the water-swellable substance occurs within about 120 seconds or less of being exposed to water, more preferably about 90 seconds or less. Additionally, dry insert 14 preferably has a maximum swell height of about 18 mm for distilled water and about 8 mm for a 5% ionic water solution, i.e., salt water; however, dry inserts with other suitable maximum swell heights may be used.

Figure 10:
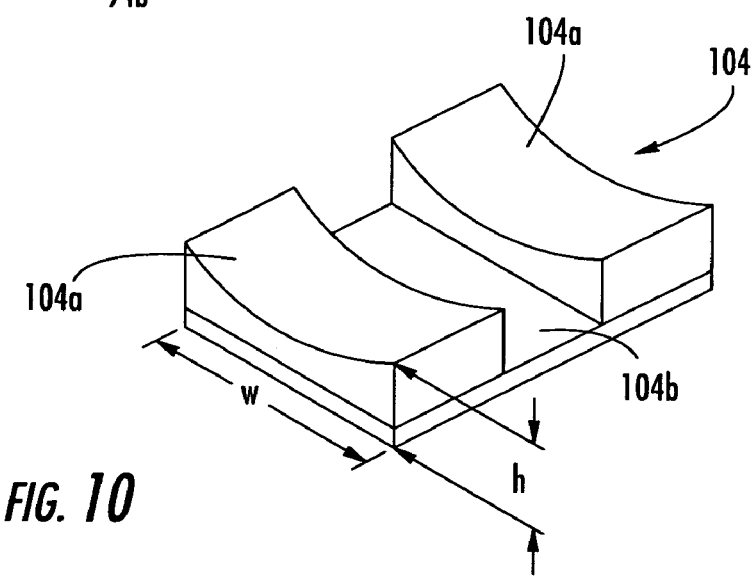
FIG. 10 is a perspective view of another dry insert according to the concepts of the present invention.

First layer 14a may be compressed during assembly so that it provides a predetermined normal force that inhibits optical waveguide 12 from being easily displaced longitudinally along tube 18. Dry insert 14 preferably has an uncompressed height h of about 5 mm or less for minimizing the tube diameter and/or cable diameter; however, any suitable height h can be used for dry insert 14. Additionally, height h of dry insert 14 need not be constant across the width, but can vary, thereby conforming to the cross-sectional shape of the optical waveguides and providing improved cushioning to improve optical performance (FIG. 10). Second layer 14b is a water-swellable layer such as a tape that inhibits the migration of water within tube 18.

Compression of dry insert 14 is actually a localized maximum compression of dry insert 14. In the case of FIG. 1, the localized maximum compression of dry insert 14 occurs at the corners of the ribbon stack across the diameter. Calculating the percentage of compression of dry insert 14 in FIG. 1 requires knowing an inner diameter of tube 18, a diagonal D dimension of the ribbon stack, and an uncompressed height h of dry insert 14. By way of example, inner diameter of tube 18 is 7.1 mm, diagonal D of the ribbon stack is 5.1 mm, and the uncompressed height h of dry insert 14 across a diameter is 3.0 mm (2 times 1.5 mm). Adding diagonal D (5.1 mm) and the uncompressed height h of dry insert 14 across the diameter (3.0 mm) yields an uncompressed dimension of 8.1 mm. When placing the ribbon stack and dry insert 14 and into tube 18 with an inner diameter of 7.1 mm, dry insert is compressed a total of 1 mm (8.1 mm–7.1 mm). Thus, dry insert 14 is compressed by about thirty percent across the diameter of tube 18.

Figure 2A:
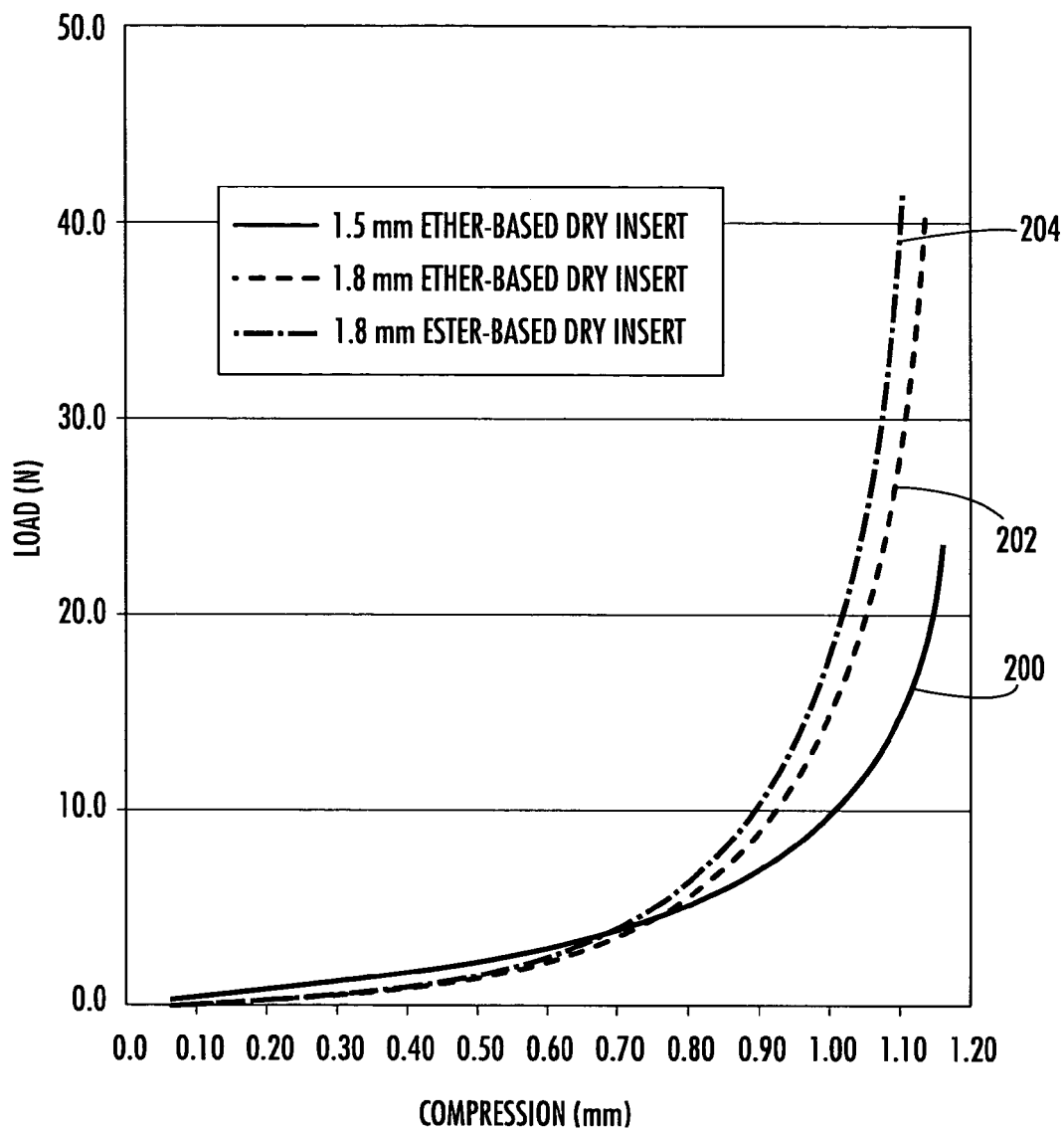
FIG. 2a is a graph depicting compression curves for three different dry inserts.

FIG. 2a is a graph depicting exemplary compression curves 200, 202, and 204 for three different dry inserts 14. Specifically, curves 200 and 202 represent two different dry inserts each having a compressible open cell ether-based PU foam layer and a water-swellable layer with respective heights h of about 1.5 mm and about 1.8 mm. On the other hand, curve 204 represents a dry insert having a compressible open cell ester-based PU foam layer and a water-swellable layer with a height of about 1.8 mm. The compression curves were generated by placing the dry insert sample between two circular plates having a diameter of about 2.2 inches while measuring the force required to compress the sample using an Instron machine.

As shown, the compression curves for all three dry inserts 14 are generally non-linear over the compression range. But generally speaking, compression curves 200, 202, and 204 have a generally linear compression up to about 0.70 mm. In one embodiment, dry insert 14 has compression of about 1.0 mm or less with a force of about 10 Newtons. Generally speaking, the foam layer is being compressed while the water-swellable layer is relatively uncompressible.

In other embodiments, first layer 14a of dry insert 14 is uncompressed in tube assembly 10, but begins to compress if optical waveguide movement is initiated. Other variations include attaching or bonding a portion of dry insert 14 to tube 18. For example, adhesives, glues, elastomers, and/or polymers 14c are disposed on a portion of the surface of dry insert 14 that contacts tube 18 for attaching dry insert 14 to tube 18. Additionally, it is possible to helically wrap dry insert 14 about optical waveguide 12, instead of being longitudinally disposed. In still further embodiments, two or more dry inserts can be formed about one or more optical waveguides 12 such as two halves placed within tube 18.

Figure 2B:
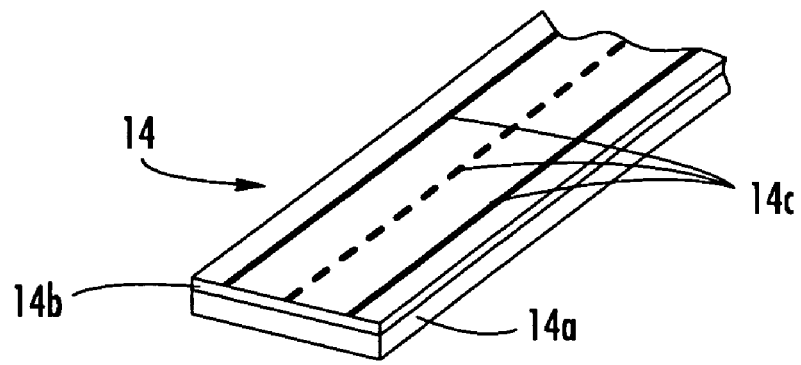
FIGS. 2b–2d depict various configurations of an adhesive/glue application to the dry insert of FIG. 2.
Figure 2C:
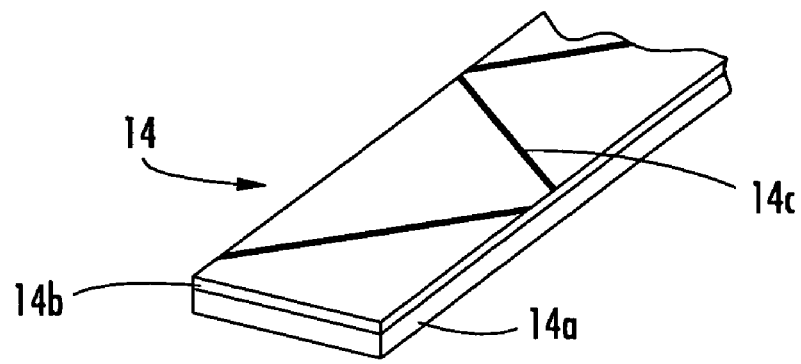
Figure 2D:
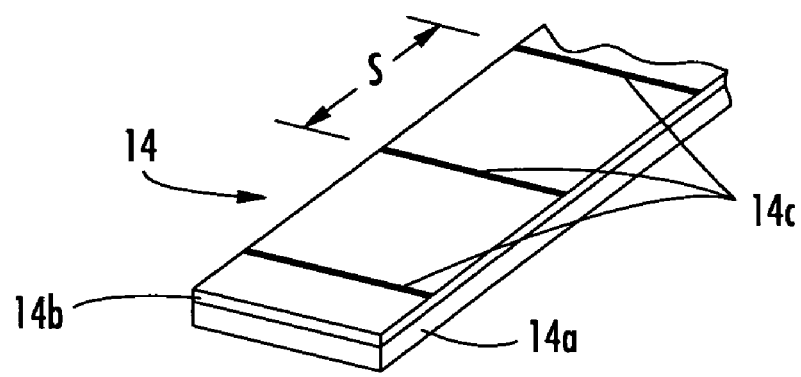

In advantageous embodiments, a fugitive glue/adhesive is used for coupling cable core 15 and/or dry insert 14 with tube 18. The glue/adhesive or the like is applied to the radially outward surface of dry insert 14, for instance, during the manufacturing process. The fugitive glue/adhesive is applied while hot or melted to the outer surface of dry insert 14 and then is cooled or frozen when the cable is quenched or cools off. By way of example, a suitable fugitive glue is available from National Starch and Chemical Company of Bridgewater, N.J. under the tradename LITE-LOK® 70-003A. The fugitive glue or other suitable adhesive/material may be applied in beads having a continuous or an intermittent configuration as shown in FIGS. 2b–2d. For instance, one or more adhesive/glue beads may be longitudinally applied along the dry insert, longitudinally spaced apart beads, in a zig-zag bead along the longitudinal axis of the dry insert, or in any other suitable configuration.

In one application, a plurality of beads of fugitive glue/adhesive or the like is applied to dry insert 14. For instance, three continuous, or non-continuous, beads can be disposed at locations so that when the dry insert is formed about the ribbon stack the beads are about 120 degrees apart. Likewise, four beads can be disposed at locations so they are about 90 degrees apart when the dry insert is formed about the optical waveguides. In embodiments having the beads spaced apart along the longitudinal axis, the beads may have a longitudinal spacing S of about 20 mm and about 800 mm or more; however, other suitable spacing may be used. Additionally, beads may be intermittently applied for minimizing the amount of material required, thereby reducing manufacturing expense while still providing sufficient coupling/adhesion.

Since tube assemblies 10 are not filled with a thixotropic material the tube may deform or collapse, thereby forming an oval shaped tube instead of a round tube. U.S. patent application Ser. No. 10/448,509 filed on May 30, 2003, the disclosure of which is incorporated herein by reference, discusses dry tube assemblies where the tube is formed from a bimodal polymeric material having a predetermined average ovality. As used herein, ovality is the difference between a major diameter D1 and a minor diameter D2 of tube 18 divided by major diameter D1 and multiplied by a factor of one-hundred, thereby expressing ovality as a percentage. Bimodal polymeric materials include materials having at least a first polymer material having a relatively high molecular weight and a second polymer material having a relatively low molecular weight that are manufactured in a dual reactor process. This dual reactor process provides the desired material properties and should not be confused with simple post reactor polymer blends that compromise the properties of both resins in the blend. In one embodiment, the tube has an average ovality of about 10 percent or less. By way of example, tube 18 is formed from a HDPE available from the Dow Chemical Company of Midland, Mich., under the tradename DGDA-2490 NT.

Figure 3:
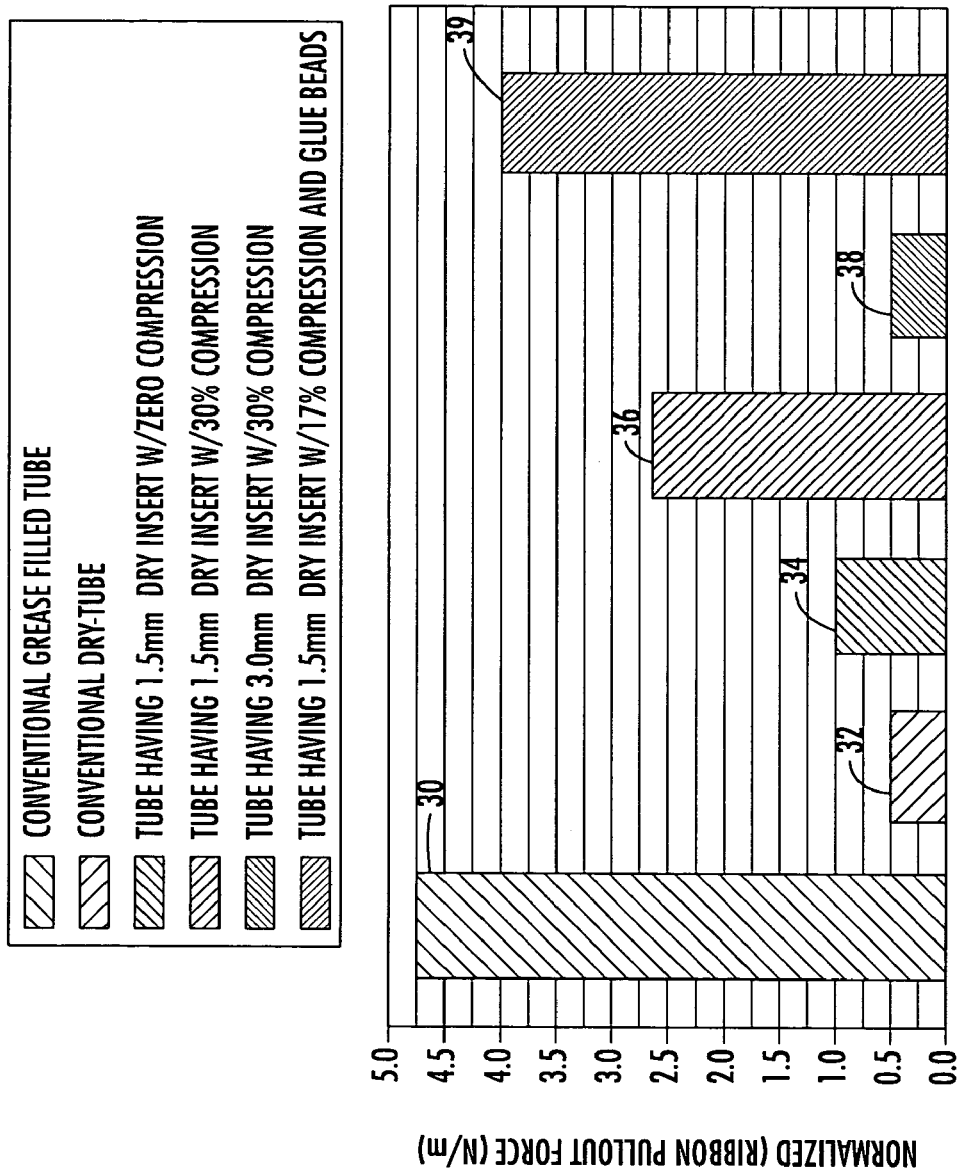
FIG. 3 is a bar graph depicting an optical ribbon pullout force for various tube configurations.
Figure 11:
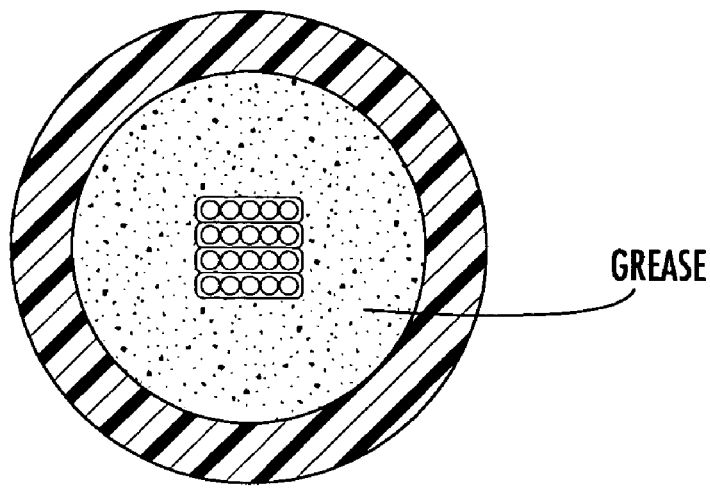
FIG. 11 is a cross-sectional view of a cable having a conventional grease filled tube assembly.
Figure 12:
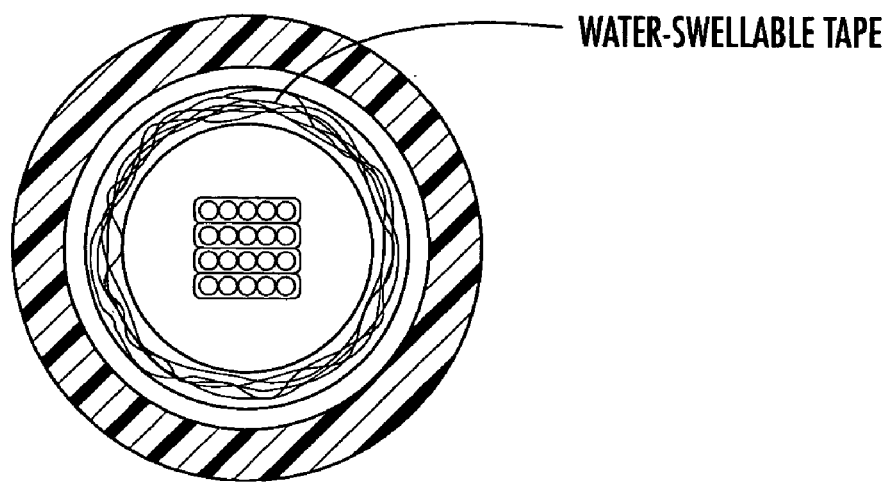
FIG. 12 is a cross-sectional view of a cable having a conventional dry tube assembly.

FIG. 3 is a bar graph depicting a normalized optical ribbon pullout force (N/m) for various tube configurations. The ribbon pullout force test measured the force required to initiate movement of a ribbon stack from a 10-meter length of cable. Of course, this test is equally applicable to loose or bundled optical waveguides. Specifically, the stack of ribbons were pulled from the tube and the force required to initiate movement was divided by the length of the cable, thereby normalizing the optical ribbon pullout force. As a baseline for comparison, bar 30 depicts a ribbon pullout force of about 4.8 N/m for a ribbon stack of 120-fibers in conventional grease (a thixotropic material) filled tube (FIG. 11). Bar 32 depicts a ribbon pullout force for a conventional dry tube design solely having a water-swellable tape around a ribbon stack of 144-fibers (FIG. 12), which are loosely disposed in a tube. Specifically, bar 32 depicts a ribbon pullout force of about 0.6 N/m for the 144-fiber ribbon stack. Thus, the conventional dry tube design (FIG. 12) has a ribbon pullout force that is about twelve percent of the ribbon pullout force of the conventional grease filled tube (FIG. 11), which is inadequate for proper cable performance.

Bars 34, 36, 38, and 39 represent tube assemblies according to the present invention. Specifically, bar 34 depicts a ribbon pullout force of a 144-fiber stack from a tube assembly 10 having dry insert 14 with an uncompressed height h of about 1.5 mm with about a zero percent compression of dry insert 14. In this embodiment, bar 34 depicts a ribbon pullout force of about 1.0 N/m, which is a surprising improvement over the conventional dry tube. Bars 36 and 38 represent configurations where dry insert 14 is compressed within tube assembly 10 by a percentage from its original height to an average compressed height. More specifically, bar 36 represents a ribbon pullout force of a similar tube assembly as bar 34, expect that in this embodiment dry insert 14 is compressed about thirty percent. In this embodiment, bar 36 depicts a ribbon pullout force of about 2.7 N/m. Bar 38 represents a ribbon pullout force of a 144-fiber ribbon stack from a tube assembly with dry insert 14 having an uncompressed height h of about 3 mm, which is compressed by about thirty percent within the tube. In this embodiment, bar 38 depicts a ribbon pullout force of about 0.5 N/m. Bar 39 represents a ribbon pullout force of a 144-fiber stack from a tube assembly 10 having dry insert 14 with an uncompressed height h of about 1.5 mm with about a seventeen percent compression of dry insert 14 and glue beads. In this case, four glue beads were continuously applied longitudinally along the dry insert so that they were spaced at about 90 degrees. The ribbon pullout force for this embodiment was about 4.0 N/m. As shown, the application of adhesive/glue beads increased the ribbon pullout force with less compression of the dry insert. Thus, according to the concepts of the present invention the compression of dry insert 14 is preferably in the range of about 10% to about 90%; however, other suitable ranges of compression may provide the desired performance. Nonetheless, the compression of dry insert 14 should not be so great as to cause undue optical attenuation in any of the optical waveguides and can be optimized with the use of adhesive/glue beads. Preferably, the ribbon pullout force is in the range of about 0.5 N/m and about 5.0 N/m, more preferably, in the range of about 1 N/m to about 4 N/m.

Figure 4:
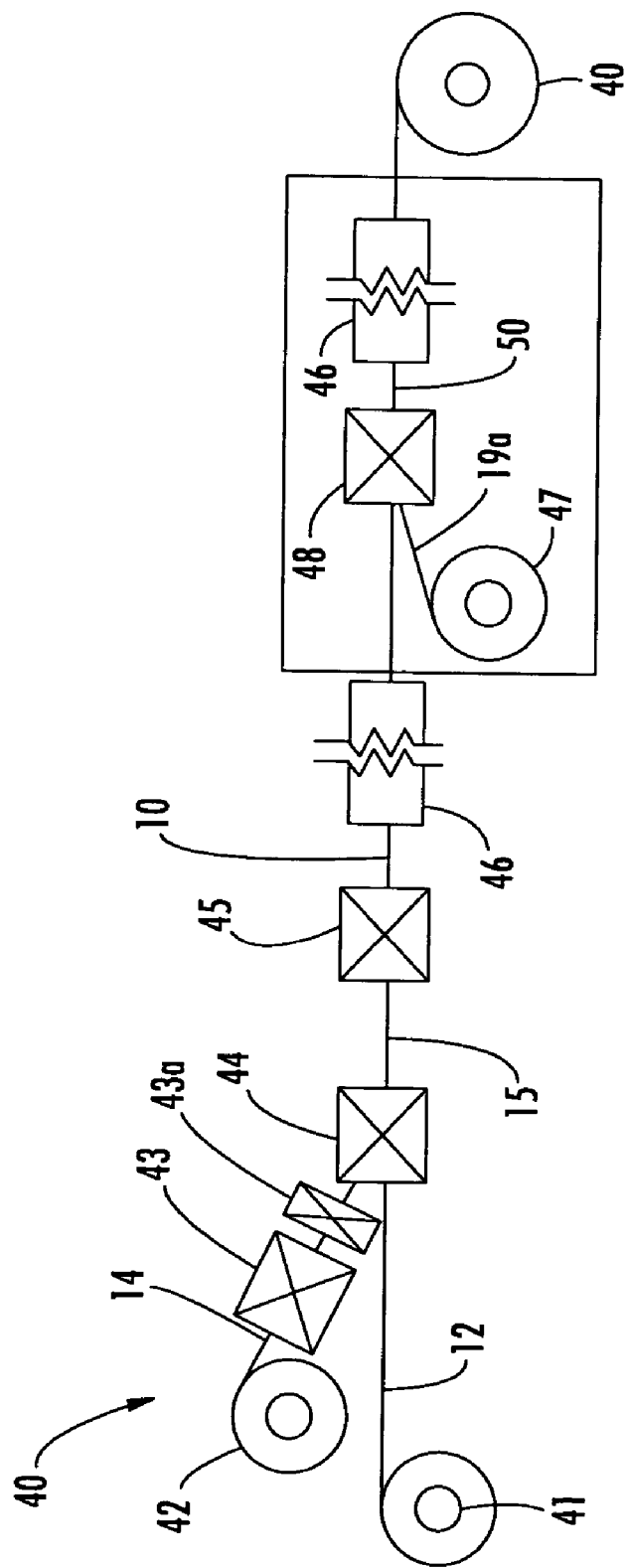
FIG. 4 is a schematic representation of a manufacturing line according to the present invention.

FIG. 4 schematically illustrates an exemplary manufacturing line 40 for tube assembly 10 according to the present invention. Manufacturing line 40 includes at least one optical waveguide payoff reel 41, a dry insert payoff reel 42, a compression station 43, an glue/adhesive station 43a, a binding station 44, a cross-head extruder 45, a water trough 46, and a take-up reel 49. Additionally, tube assembly 10 may have a sheath 20 therearound, thereby forming a cable 50 as illustrated in FIG. 5. Sheath 20 can include strength members 19a and a jacket 19b, which can be manufactured on the same line as tube assembly 10 or on a second manufacturing line. The exemplary manufacturing process includes paying-off at least one optical waveguide 12 and dry insert 14 from respective reels 41 and 42. Only one payoff reel for optical waveguide 12 and dry insert 14 are shown for clarity; however, the manufacturing line can include any suitable number of payoff reels to manufacture tube assemblies and cables according to the present invention. Next, dry insert 14 is compressed to a predetermined height h at compression station 43 and an adhesive/glue is applied to the outer surface of dry insert 14 at station 43a. Then dry insert 14 is generally positioned around optical waveguide 12 and binding station wraps or sews one or more binding threads around dry insert 14, thereby forming core 15. Thereafter, core 15 is feed into cross-head extruder 45 where tube 18 is extruded about core 15, thereby forming tube assembly 10. Tube 18 is then quenched in water trough 46 and then tube assembly 10 is wound onto take-up reel 49. As depicted in the dashed box, if one manufacturing line is set-up to make cable 50, then strength members 19a are paid-off reel 47 and positioned adjacent to tube 18, and jacket 19b is extruded about strength members 19a and tube 18 using cross-head extruder 48. Thereafter, cable 50 passes into a second water trough 46 before being wound-up on take-up reel 49. Additionally, other cables and/or manufacturing lines according to the concepts of the present invention are possible. For instance, cables and/or manufacturing lines may include a water-swellable tape 19c and/or an armor between tube 18 and strength members 19a; however, the use of other suitable cable components are possible.

Figure 6:
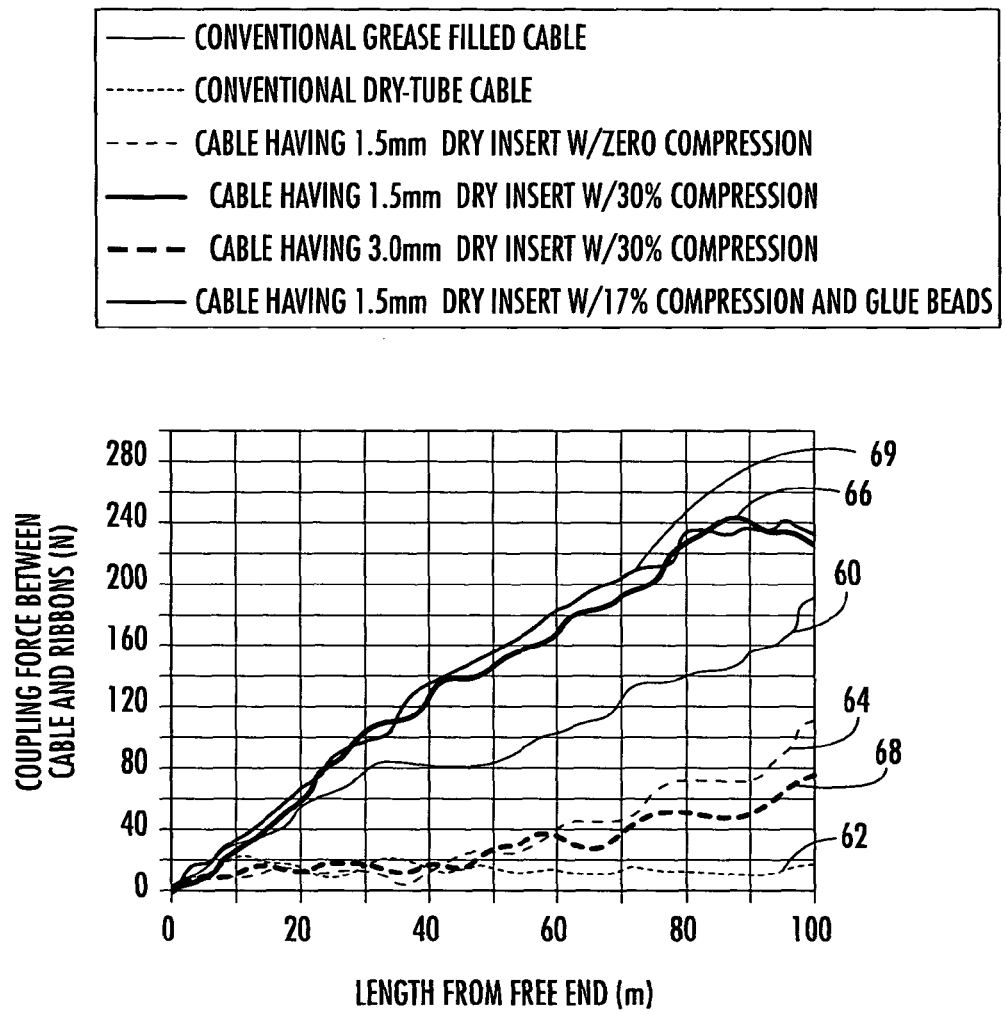
FIG. 6 is a graph depicting an optical ribbon coupling force associated with various cable configurations.

FIG. 6 is a graph depicting the results of a ribbon coupling force for cables having the similar tube assemblies as used in FIG. 3. The ribbon coupling force test is used for modeling the forces applied to the optical waveguide(s) when subjecting a cable to, for example, pulling during installation of the cable. Although the results between the ribbon pullout force and the ribbon coupling force may have forces in the same general range, the ribbon coupling force is generally a better indicator of actual cable performance.

In this case, the ribbon coupling test simulates an underground cable installation in a duct by applying 600 pounds of tension on a 250 m length of cable by placing pulling sheaves on the respective sheathes of the cable ends. However, other suitable loads, lengths, and/or installation configurations can be used for characterizing ribbon coupling in other simulations. Then, the force on the optical waveguide(s) along its length is measured from the end of cable. The force on the optical waveguide(s) is measured using a Brillouin Optical Time-Domain Reflectometer (BOTDR). Determining a best-fit slope of the curve normalizes the ribbon coupling force.

As a baseline for comparison, curve 60 depicts a normalized ribbon coupling force of about 1.75 N/m for a cable having a ribbon stack of 120-fibers in conventional grease filled cable (FIG. 11). Curve 62 depicts a ribbon pullout force for a cable having a conventional dry tube design having a water-swellable tape around a ribbon stack of 144-fibers (FIG. 12), which are loosely disposed in a tube. Specifically, curve 62 depicts a normalized ribbon coupling force of about 0.15 N/m for the 144-fiber ribbon stack. Thus, the conventional dry tube design (FIG. 12) has a normalized ribbon coupling force that is about nine percent of the normalized ribbon coupling force of the conventional grease filled tube (FIG. 11), which is inadequate for proper cable performance. In other words, the ribbon stack of the conventional dry tube cable is easily displacable during stretching of the cable sheath, for example, during aerial ice loading, aerial galloping, cable dig-ups, and pulling during installation of the cable.

Curves 64, 66, 68, and 69 represent cables according to the present invention. Specifically, curve 64 depicts a ribbon coupling force of a cable having a 144-fiber stack with a tube assembly 10 having dry insert 14 with an uncompressed height h of about 1.5 mm with about a zero percent compression of dry insert 14. In this embodiment, curve 64 depicts a ribbon coupling force of about 0.80 N/m, which is an improvement over the conventional dry cable of FIG. 12. Curves 66 and 68 represent cable configurations where dry insert 14 is compressed within tube assembly 10 by a percentage from its original height to an average compressed height. More specifically, curve 66 represents a ribbon coupling force of a similar cable as curve 64, expect that in this embodiment dry insert 14 is compressed about thirty percent. In this embodiment, curve 66 depicts a ribbon coupling force of about 2.80 N/m. Curve 68 represents a ribbon coupling force of a cable having a 144-fiber ribbon stack from a cable having a tube assembly with dry insert 14 having an uncompressed height h of about 3 mm, which is compressed by about thirty percent within the tube. In this embodiment, curve 68 depicts a ribbon coupling force of about 0.75 N/m. Curve 69 represents a ribbon coupling force of a cable having a 144-fiber ribbon stack from a cable having a tube assembly with dry insert 14 having an uncompressed height h of about 1.5 mm, which is compressed by about seventeen percent within the tube and includes adhesive/glue beads. In this case, four glue beads were continuously applied longitudinally along the dry insert so that they were spaced at about 90 degrees. As shown, curve 69 depicts a ribbon coupling force that is similar to curve 66, about 2.80 N/m, with less compression of the dry insert. Thus, according to the concepts of the present invention the ribbon coupling force is preferably in the range of about 0.5 N/m to about 5.0 N/m, more preferably, in the range of about 1 N/m to about 4 N/m. However, other suitable ranges of ribbon coupling force may provide the desired performance.

Figure 7:
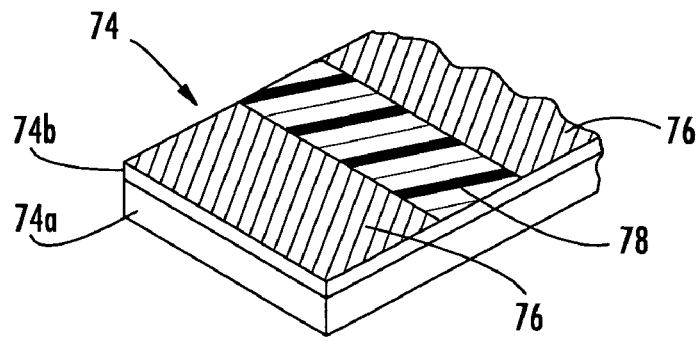
FIG. 7 is a perspective view of another dry insert according to the concepts of the present invention.

Additionally, the concepts of the present invention can be employed with other configurations of the dry insert. As depicted in FIG. 7, dry insert 74 has a first layer 74a and a second layer 74b that includes different suitable types of water-swellable substances. In one embodiment, two different water-swellable substances are disposed in, or on, second layer 14b so that tube assembly 10 is useful for multiple environments and/or has improved water-blocking performance. For instance, second layer 14b can include a first water-swellable component 76 effective for ionized liquids such as saltwater and a second water-swellable component 78 effective for non-ionized liquids. By way of example, first water-swellable material is a polyacrylamide and second water-swellable material is a polyacrylate superabsorbent. Moreover, first and second water-swellable components 76,78 can occupy predetermined sections of the water-swellable tape. By alternating the water-swellable materials, the tape is useful for standard applications, salt-water applications, or both. Other variations of different water-swellable substances include having a water-swellable substance with different swell speeds, gel strengths and/or adhesion with the tape.

Figure 8:
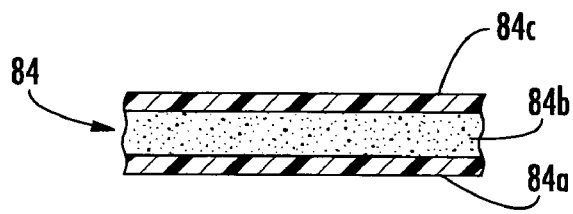
FIG. 8 is a cross-sectional view of another dry insert according to the concepts of the present invention.

FIG. 8 depicts another embodiment of the dry insert. Dry insert 84 is formed from three layers. Layers 84a and 84c are water-swellable layers that sandwich a layer 84b that is compressible for providing a coupling force to the at least one optical waveguide. Likewise, other embodiments of the dry insert can include other variations such at least two compressible layers sandwiching a water-swellable layer. The two compressible layers can have different spring constants for tailoring the normal force applied to the at least optical waveguide.

Figure 9:
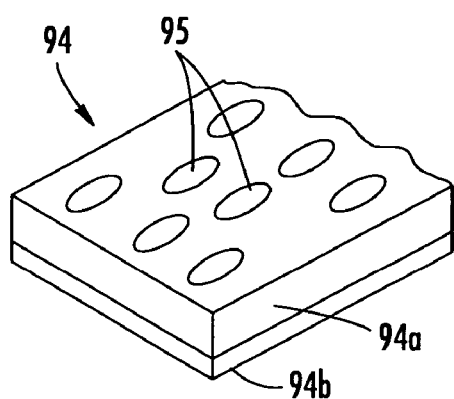
FIG. 9 is a perspective view of another dry insert according to the concepts of the present invention.

FIG. 9 illustrates a dry insert 94 having layers 94a and 94b according to another embodiment of the present invention. Layer 94a is formed from a closed-cell foam having at least one perforation 95 therethrough and layer 94b includes at least one water-swellable substance; however, other suitable materials can be used for the compressible layer. The closed-cell foam acts as a passive water-blocking material that inhibits water from migrating therealong and perforation 95 allows an activated water-swellable substance of layer 94b to migrate radially inward towards the optical waveguide. Any suitable size, shape, and/or pattern of perforation 95 that allows the activated water-swellable substance to migrate radially inward to effectively block water is permissible. The size, shape, and/or pattern of perforations can be selected and arranged about the corner optical waveguides of the stack, thereby improving corner optical waveguide performance. For example, perforations 95 can provide variation in dry insert compressibility, thereby tailoring the normal force on the optical waveguides for maintaining optical performance.

FIG. 10 depicts dry insert 104, which illustrates other concepts of the present invention. Dry insert 104 includes layers 104a and 104b. Layer 104a is formed of a plurality of non-continuous compressible elements that are disposed on layer 104b, which is a continuous water-swellable layer. In one embodiment, the elements of layer 104a are disposed at regular intervals that generally correlate with the lay length of a ribbon stack. Additionally, the elements have a height h that varies across their width w. Stated another way, the elements are shaped to conform to the shape of the optical waveguides they are intended to generally surround.

Figure 13:
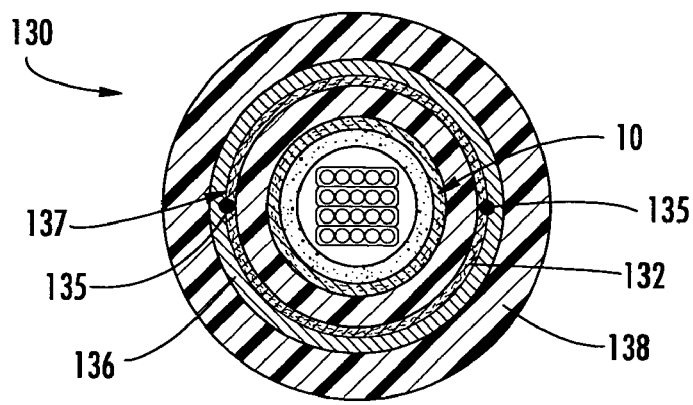
FIG. 13 is a cross-sectional view of a fiber optic cable with an armor layer according to the present invention.

FIG. 13 depicts cable 130, which is another embodiment of the present invention that employs tube assembly 10. Cable 130 includes a sheath system 137 about tube assembly 10 for protecting tube assembly 10 from, for instance, crushing forces and environmental effects. In this case, sheath system 137 includes a water-swellable tape 132 that is secured by a binder thread (not visible), a pair of ripcords 135, an armor tape 136, and a jacket 138. Armor tape 136 is preferably rolled formed; however, other suitable manufacturing methods may be used. The pair of ripcords 135 are generally disposed about one-hundred and eighty degrees apart with about ninety degree intervals from the armor overlap, thereby inhibiting the shearing of ripcord on an edge of the armor tape during use. In preferred embodiments, ripcords suitable for ripping through an armor tape have a construction as disclosed in U.S. patent application Ser. No. 10/652,046 filed on Aug. 29, 2003, the disclosure of which is incorporated herein by reference. Armor tape 136 can be either a dielectric or a metallic material. If a dielectric armor tape is used the cable may also include a metallic wire for locating the cable in buried applications. In other words, the metallic wire makes the cable tonable. Jacket 138 generally surrounds armor tape 136 and provides environmental protection to cable 130. Of course, other suitable sheath systems may be used about the tube assembly.

Figure 14:
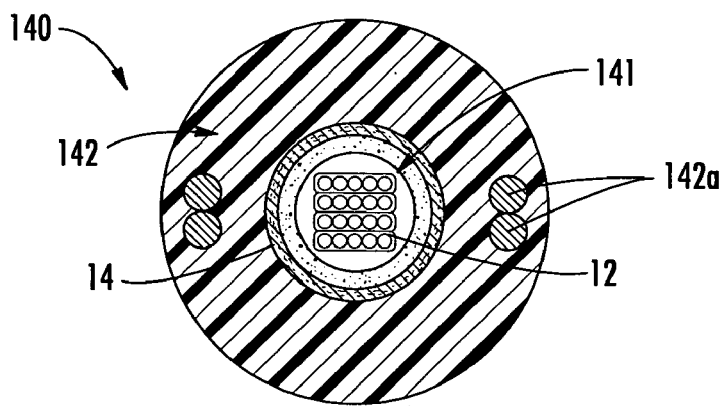
FIG. 14 is a cross-sectional view of a tubeless fiber optic cable according to the present invention.

FIG. 14 depicts fiber optic cable 140. Cable 140 includes at least one optical waveguide 12 and a dry insert 14 forming a cable core 141 within a sheath system 142. In other words, cable 140 is a tubeless design since access to the cable core 141 is accomplished by solely cutting open sheath system 142. Sheath system 142 also includes strength members 142a embedded therein and disposed at about 180 degrees apart, thereby imparting a preferential bend to the cable. Of course, other sheath systems configurations such as different types, quantities, and/or placement of strength members 142a are possible. Cable 140 may also include one or more ripcords 145 disposed between cable core 141 and sheath 142 for ripping sheath 142, thereby allowing the craftsman easy access to cable core 141.

Figure 15:
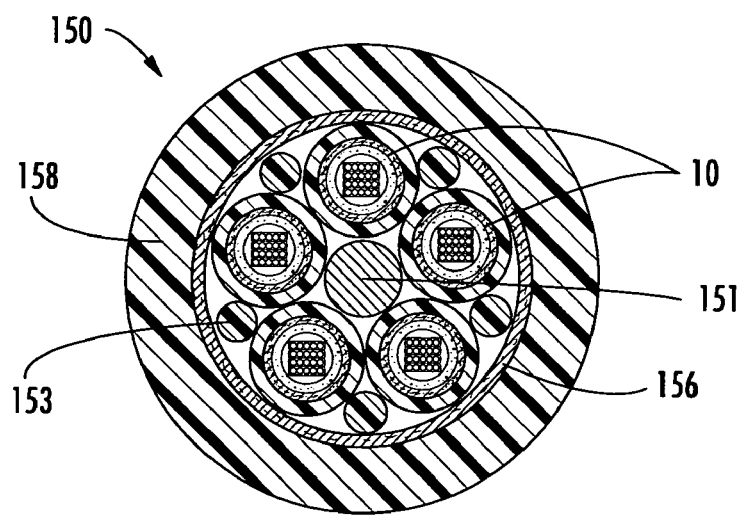
FIG. 15 is a cross-sectional view of a fiber optic cable having stranded tubes according to the present invention.

FIG. 15 depicts a fiber optic cable 150 having a plurality of tube assemblies 10 stranded about a central member 151. Specifically, tube assemblies 10 along with a plurality of filler rods 153 are S-Z stranded about central member 151 and are secured with one or more binder threads (not visible), thereby forming a stranded cable core. The stranded cable core has a water-swellable tape 156 thereabout, which is secured with a binder thread (not visible) before jacket 158 is extruded thereover. Optionally, aramid fibers, other suitable strength members and/or water blocking components such as water-swellable yarns may be stranded about central member 151, thereby forming a portion of the stranded cable core. Likewise, water-swellable components such as a yarns or tape may be placed around central member 151 for inhibiting water migration along the middle of cable 150. Other variations of cable 150 can include an armor tape, an inner jacket, and/or different numbers of tube assemblies.

Many modifications and other embodiments of the present invention, within the scope of the appended claims, will become apparent to a skilled artisan. For example, optical waveguides can be formed in a variety of ribbon stacks or configurations such as a stepped profile of the ribbon stack. Cables according to the present invention can also include more than one optical tube assembly stranded helically, rather than S-Z stranded configurations. Additionally, dry inserts of the present invention can be laminated together as shown or applied as individual components. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations. For instance, dry inserts of the present invention are suitable for other types of tubeless cables having a sheath around a cable core.

The invention claimed is:

1. An optical tube assembly comprising:
a tube, the tube having an interior surface;
at least one optical waveguide, the at least one optical waveguide being disposed in the tube; and
at least one dry insert, the at least one dry insert having a first layer and a second layer, the first layer being a polyurethane foam and the second layer being a water-swellable component, wherein the at least one dry insert is disposed within the tube adjacent to the interior surface of the tube and disposed about the at least one optical waveguide, thereby coupling the at least one optical waveguide with the interior surface of the tube.

2. The optical tube assembly of claim 1, the at least one dry insert being compressed at least 10 percent or more for coupling the at least one optical waveguide to an interior surface of the tube.

3. The optical tube assembly of claim 1, the compression of the at least one dry insert being about 90% or less for coupling the at least one optical waveguide to the interior surface of the tube.

4. The optical tube assembly of claim 1, the polyurethane foam being an open cell ether-based polyurethane foam.

5. The optical tube assembly of claim 1, the water-swellable component being a water-swellable tape.

6. The optical tube assembly of claim 5, the water-swellable tape having a first water-swellable component and a second water-swellable component.

7. The optical tube assembly of claim 1, further comprising one or more materials selected from the group of adhesives, glues, elastomers, and polymers for attaching the at least one dry insert to the tube.

8. The optical tube assembly of claim 1, the at least one optical waveguide being a portion of a fiber optic ribbon, the fiber optic ribbon having a positive excess ribbon length (ERL).

9. The optical tube assembly of claim 1, the polyurethane foam having a density in the range of about 1 lb/ft$^3$ to about 3 lb/ft$^3$.

10. The optical tube assembly of claim 1, the at least one optical waveguide having a normalized pull-out force between about 0.5 N/m and about 5.0 N/m.

11. The optical tube assembly of claim 1, the at least one optical waveguide having a normalized pull-out force between about 1 N/m and about 4 N/m.

12. The optical tube assembly of claim 1, the at least one optical waveguide being a portion of a ribbon, the ribbon having a normalized ribbon pull-out force between about 0.5 N/m and about 5.0 N/m.

13. The optical tube assembly of claim 1, the at least one optical waveguide being a portion of a ribbon, the ribbon having a normalized pull-out force between about 1 N/m and about 4 N/m.

14. The optical tube assembly of claim 1, the at least one dry insert having an uncompressed height h of about 5 mm or less.

15. The optical tube assembly of claim 1, the optical tube assembly being a portion of a fiber optic cable.

16. The optical tube assembly of claim 15, the fiber optic cable having a normalized ribbon coupling force between about 0.5 N/m and about 5 N/m.

17. The optical tube assembly of claim 1, the optical tube assembly being a portion of a fiber optic cable, the fiber optic cable having an armor tape.

18. The optical tube assembly of claim 1, the at least one optical waveguide being a portion of a ribbon stack having at least one corner optical waveguide, the at least one corner optical waveguide having a MAC number of about 7.35 or less.

19. The optical tube assembly of claim 1, the tube being formed from a bimodal material.

20. The optical tube assembly of claim 1, the at least one optical fiber having an excess fiber length.

21. The optical tube assembly of claim 1, the at least one dry insert at least partially contacting the at least one optical waveguide or a fiber optic ribbon.

22. The optical tube assembly of claim 1, the polyurethane foam facing the at least one optical waveguide.

23. The optical tube assembly of claim 1, the at least one dry insert being a longitudinal tape disposed about the at least one optical waveguide.

24. An optical tube assembly comprising:
a tube, the tube having an interior surface;
at least one optical waveguide, the at least one optical waveguide being disposed within the tube and having a positive excess length compared with the tube; and
at least one dry insert, the at least one dry insert having at least two laminated layers disposed about the at least one optical waveguide, thereby forming a core that is disposed within the tube, the at least one dry insert comprising a compressible layer and at least one water-swellable layer, wherein the at least one dry insert acts to couple the at least one optical waveguide to the interior surface of the tube while cushioning the at least one optical waveguide, thereby maintaining an optical attenuation below about 0.4 dB/km at a reference wavelength of 1310 nm.

25. The optical tube assembly of claim 24, the compressible layer being a foam tape that is compressed by about 10% or more.

26. The optical tube assembly of claim 24, the compressible layer being a foam tape that is compressed by about 90% or less.

27. The optical tube assembly of claim 24, one of the at least two laminated layers comprising an open cell ether-based polyurethane foam.

28. The optical tube assembly of claim 24, one of the at least two laminated layers being a water-swellable tape.

29. The optical tube assembly of claim 24, the at least one water-swellable layer having a first water-swellable component and a second water-swellable component.

30. The optical tube assembly of claim 24, further comprising one or more materials selected from the group of adhesives, glues, elastomers, and polymers for attaching the at least one dry insert to the tube.

31. The optical tube assembly of claim 24, the at least one optical waveguide having a normalized pull-out force between about 0.5 N/m and about 5.0 N/m.

32. The optical tube assembly of claim 24, the at least one optical waveguide having a normalized pull-out force between about 1 N/m and about 4 N/m.

33. The optical tube assembly of claim 24, the at least one optical waveguide being a portion of a ribbon, the ribbon having a normalized pull-out force between about 0.5 N/m and about 5.0 N/m.

34. The optical tube assembly of claim 24, the at least one optical waveguide being a portion of a ribbon, the ribbon having a normalized pull-out force between about 1 N/m and about 4 N/m.

35. The optical tube assembly of claim 24, the at least one dry insert having an uncompressed height of about 5 mm or less.

36. The optical tube assembly of claim 24, the at least one optical waveguide being a portion of a fiber optic ribbon, the fiber optic ribbon having a positive excess ribbon length (ERL).

37. The optical tube assembly of claim 36, the fiber optic cable having a normalized ribbon coupling force between about 0.5 N/m and about 5 N/m.

38. The optical tube assembly of claim 24, the compressible layer being a polyurethane foam having a density in the range of about 1 lb/ft$^3$ to about 3 lb/ft$^3$.

39. The optical tube assembly of claim 24, the optical tube assembly being a portion of a fiber optic cable.

40. The optical tube assembly of claim 24, the optical tube assembly being a portion of a fiber optic cable, the fiber optic cable having an armor tape.

41. The optical tube assembly of claim 24, the at least one optical waveguide being a portion of a ribbon stack having at least one corner optical waveguide, the at least one corner optical waveguide having a MAC number of about 7.35 or less.

42. The optical tube assembly of claim 24, the tube being formed from a bimodal material.

43. The optical tube assembly of claim 24, the at least one optical waveguide having an excess fiber length.

44. The optical tube assembly of claim 24, the at least one dry insert at least partially contacting the at least one optical waveguide or a fiber optic ribbon.

45. The optical tube assembly of claim 24, the compressible layer facing the at least one optical waveguide.

46. The optical tube assembly of claim 45, the compressible layer being a foam.

47. The optical tube assembly of claim 24, the at least one dry insert being a longitudinal tape disposed about the at least one optical waveguide.

48. An optical tube assembly comprising:
a tube;
at least one optical waveguide; and
at least one dry insert, the at least one dry insert having a polyurethane foam layer, wherein the at least one dry insert and the at least one optical waveguide form a core disposed within the tube, wherein the at least one optical waveguide has a normalized pull-out force between about 0.5 N/m and about 5.0 N/m when pulled from the at least one dry insert.

49. The optical tube assembly of claim 48, the normalized pull-out force being between about 1 N/m and about 4 N/m.

50. The optical tube assembly of claim 48, the at least one optical waveguide being a portion of a ribbon, the ribbon having the normalized pull-out force.

51. The optical tube assembly of claim 50, the normalized pull-out force of the ribbon being between about 1 N/m and about 4 N/m.

52. The optical tube assembly of claim 48, the at least one dry insert comprising an open cell ether-based polyurethane foam layer and at least one water-swellable member.

53. The optical tube assembly of claim 52, the water-swellable member being a water-swellable tape.

54. The optical tube assembly of claim 48, the polyurethane foam layer being compressed by about 10% or more.

55. The optical Lube assembly of claim 48, the polyurethane foam layer being compressed by about 90% or less.

56. The optical tube assembly of claim 48, the dry insert further comprising a water-swellable member having a first water-swellable component and a second water-swellable component.

57. The optical tube assembly of claim 56, the first water-swellable component being effective for ionized liquids and the second water-swellable component being effective for non-ionized liquids.

58. The optical tube assembly of claim 48, further comprising one or more materials selected from the group of adhesives, glues, elastomers, and polymers for attaching the at least one dry insert to the tube.

59. The optical tube assembly of claim 48, the at least one dry insert having an uncompressed height of about 5 mm or less.

60. The optical tube assembly of claim 48, the optical tube assembly being a portion of a fiber optic cable.

61. The optical tube assembly of claim 60, the fiber optic cable having a normalized ribbon coupling force between about 0.5 N/m and about 5 N/m.

62. The optical tube assembly of claim 48, the at least one optical waveguide being a portion of a fiber optic ribbon, the fiber optic ribbon having a positive excess ribbon length (ERL).

63. The optical tube assembly of claim 48, the polyurethane foam layer having a density in the range of about 1 $lb/ft^3$ to about 3 $lb/ft^3$.

64. The optical tube assembly of claim 48, the optical tube assembly being a portion of a fiber optic cable, the fiber optic cable having an armor tape.

65. The optical tube assembly of claim 48, the at least one optical waveguide being a portion of a ribbon stack having at least one corner optical waveguide, the at least one corner optical waveguide having a MAC number of about 7.35 or less.

66. The optical tube assembly of claim 48, the tube being formed from a bimodal material.

67. The optical tube assembly of claim 48, the core further including a water-swellable member.

68. The optical tube assembly of claim 48, the at least one dry insert being a longitudinal tape disposed about the at least one optical waveguide.

* * * * *